T. E. EWER.
MOWING MACHINE.
APPLICATION FILED JULY 19, 1907.
921,210.
Patented May 11, 1909.
4 SHEETS—SHEET 3.
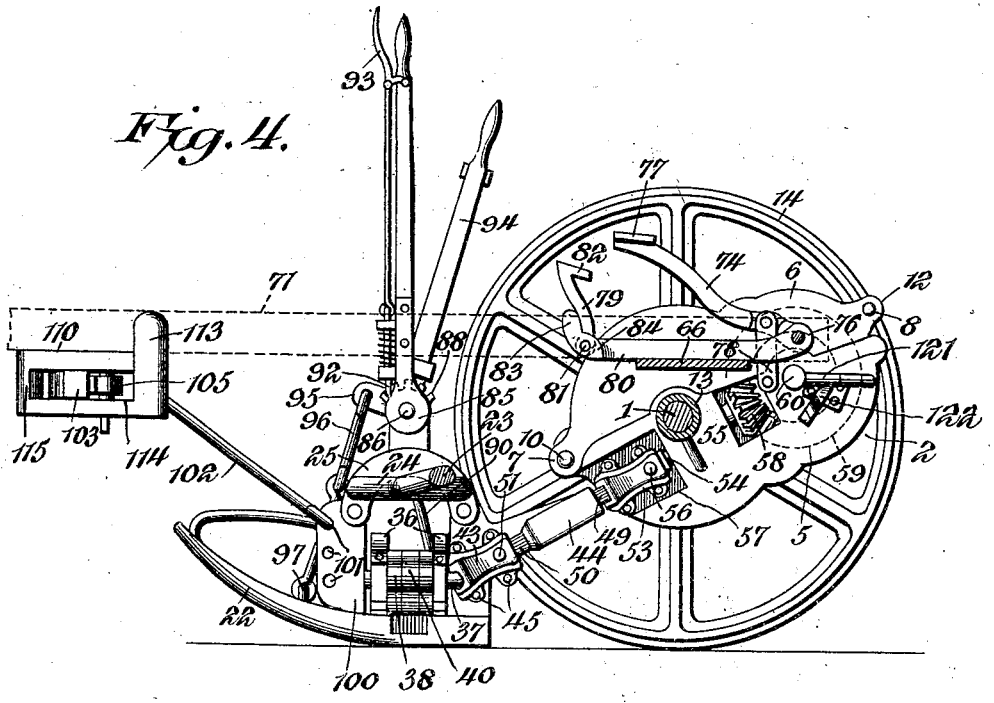
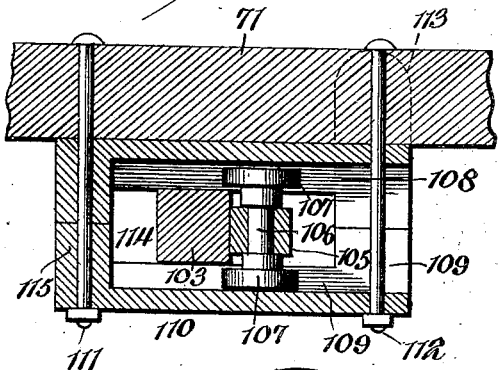
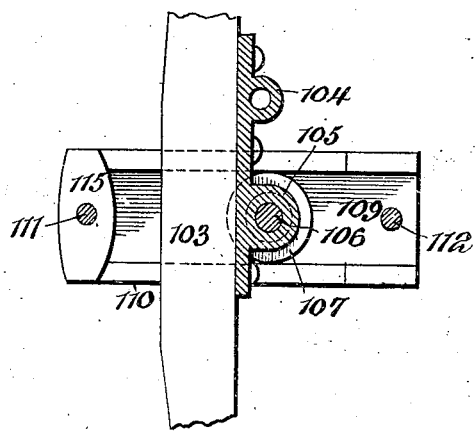
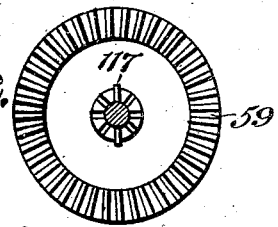
Witnesses
Howard D. Orr.
H. J. Riley
Thomas E. Ewer, Inventor,
By E. G. Siggers
Attorney

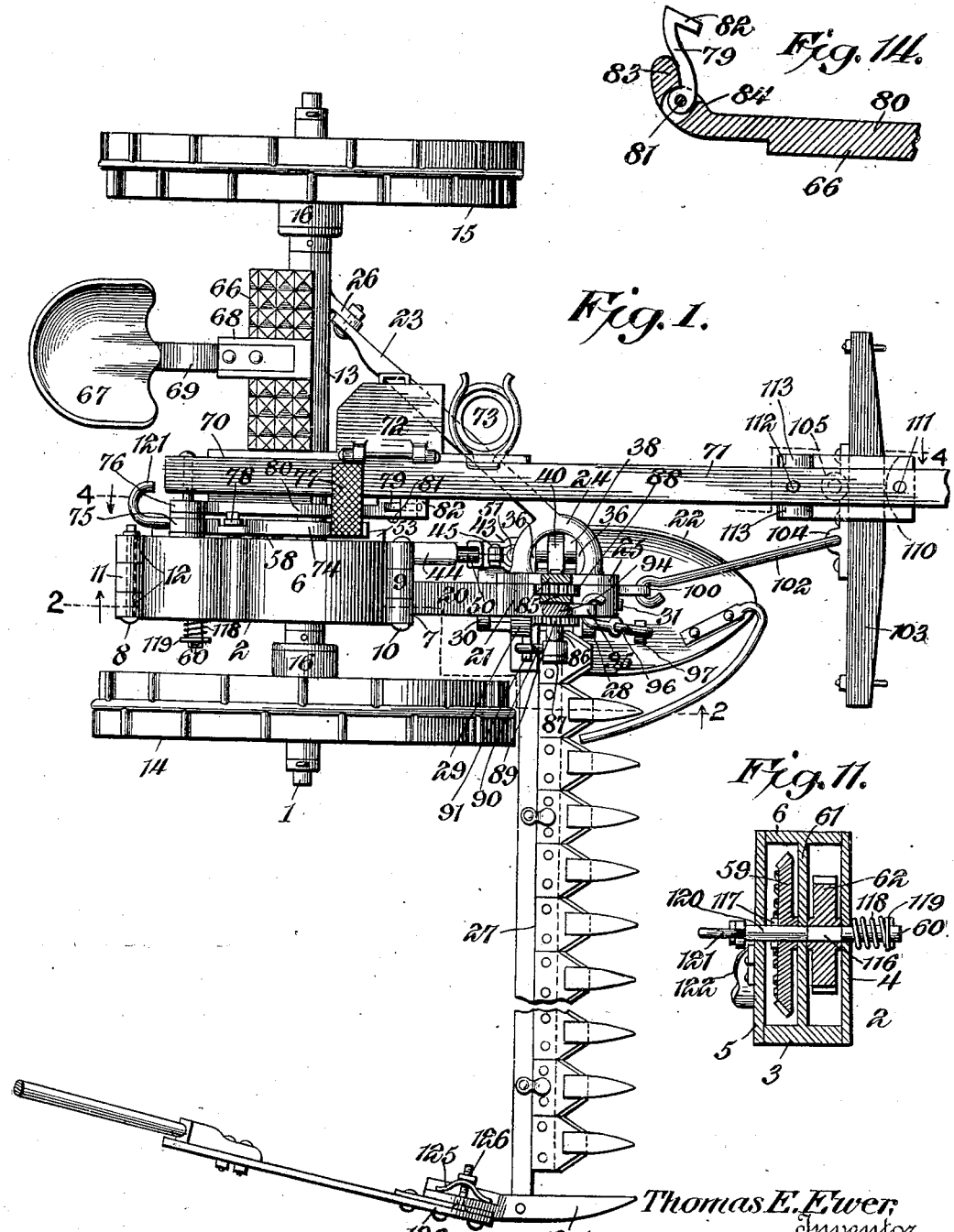

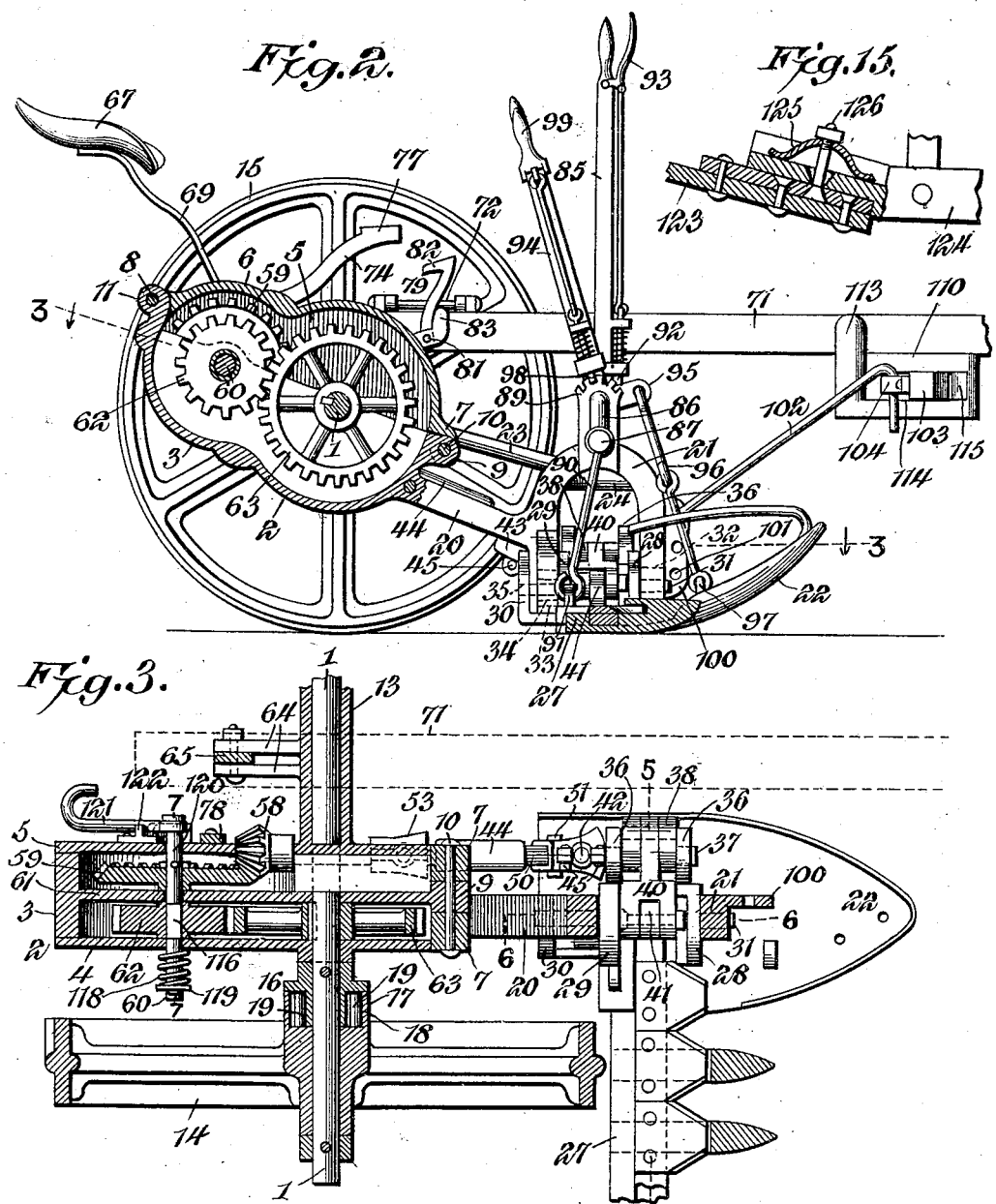

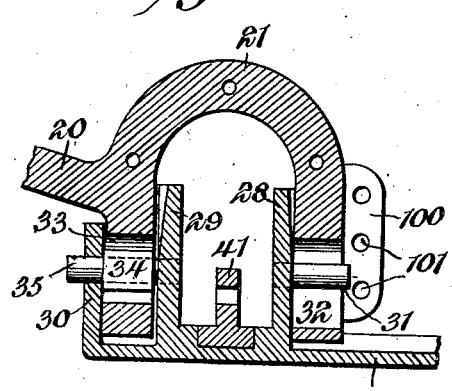
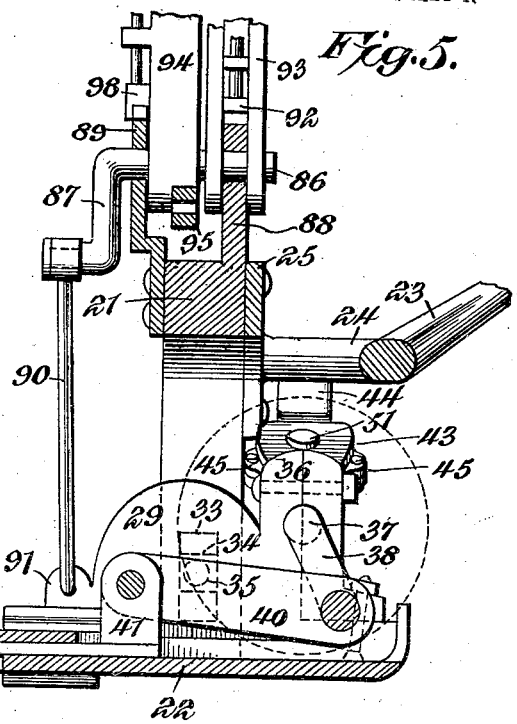
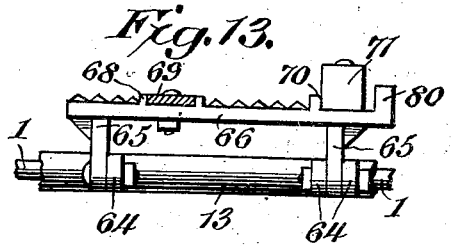
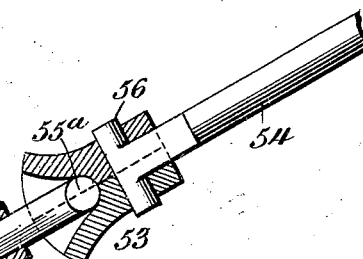
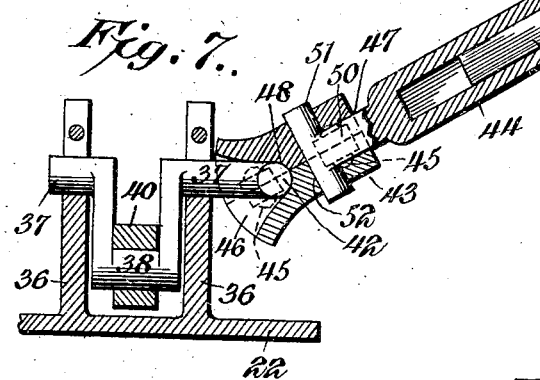
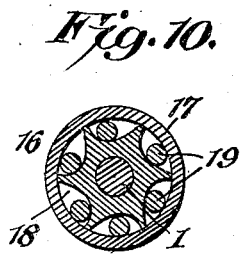

UNITED STATES PATENT OFFICE.

THOMAS E. EWER, OF FORT DES MOINES, IOWA.

MOWING-MACHINE.

No. 921,210.  Specification of Letters Patent.  Patented May 11, 1909.

Application filed July 19, 1907. Serial No. 384,577.

*To all whom it may concern:*

Be it known that I, THOMAS E. EWER, a citizen of the United States, residing at Fort Des Moines, in the county of Polk and State of Iowa, have invented a new and useful Mowing-Machine, of which the following is a specification.

The invention relates to improvements in mowing machines.

The object of the present invention is to improve the construction of mowing machines, and to provide a simple, inexpensive and efficient mowing machine of great strength and durability, provided with cutting mechanism adapted to cut close to trees and stumps, and capable of cutting grain smoothly at each side of a knoll.

A further object of the invention is to provide means for raising and lowering the cutting mechanism and the supporting frame a sufficient distance to enable the machine to pass over high stumps and for pivotally adjusting the cutting mechanism to arrange the same in proper position with relation to the ground, and also to throw the cutting mechanism up out of the way when desired.

Another object of the invention is to provide means for adjustably connecting the draft animals with the tongue and with the main or supporting frame at the inner end of the cutting mechanism, and thereby relieving the frame of the end thrust, which is present when the draft devices are mounted solely on the tongue.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view partly in section, showing a mowing machine constructed in accordance with this invention. Fig. 2 is a vertical sectional view, taken substantially on the line 2—2 of Fig. 1. Fig. 3 is a sectional view on the line 3—3 of Fig. 2. Fig. 4 is a longitudinal sectional view, taken substantially on the line 4—4 of Fig. 1. Fig. 5 is an enlarged detail sectional view, taken substantially on the line 5—5 of Fig. 3. Fig. 6 is an enlarged detail sectional view, taken substantially on the line 6—6 of Fig. 3. Fig. 7 is an enlarged detail construction of the flexible shaft for connecting the gearing with the crank shaft, which reciprocates the cutter or sickle bar. Figs. 8 and 9 are detail sectional views, illustrating the construction of the slidable connection between the doubletree and the tongue. Fig. 10 is a detail view of one of the clutches. Fig. 11 is a detail sectional view, taken substantially on the line 7—7 of Fig. 3. Fig. 12 is a detail view of the clutch mechanism. Fig. 13 is a detail view, illustrating the manner of mounting the tongue on the axle. Fig. 14 is a detail view of the catch for locking the cutting mechanism in an elevated position. Fig. 15 is a detail horizontal sectional view, illustrating the manner of yieldably mounting the swath-board.

Like numerals of reference designate corresponding parts in all the figures of the drawings.

The main frame of the machine, which is pivotally supported by an axle 1, is provided at the right hand side, or the side adjacent to the cutting mechanism with a gear case 2, consisting of a body portion 3, inner and outer side plates 4 and 5 and a top or cap 6, hinged at its front end 7 and detachably secured at its rear end to the body of the gear case by means of a transverse bolt 8, or other suitable fastening device. The front end of the case is provided with a perforated lug or ear 9, and the cap or cover 6 has spaced ears or lugs, which receive the lug or ear 9 between them. A pivot or spindle 10 pierces the lugs or ears. The rear end of the body of the case and the cap or cover are provided with similar lugs or ears 11 and 12 to receive the fastening device 8. When the fastening device 8 is removed, the cap or cover may be swung upward to afford access to the gearing hereinafter described. The side plates are secured to the body of the gear case by suitable fastening devices, but the sides may be cast with the body of the case, if desired. The inner side plate is cast integral with a sleeve 13, which incases the axle.

The axle is supported by carrying wheels 14 and 15, loosely arranged on the ends of the shaft and connected with the same by suitable clutches 16, which cause a rotation of the shaft or axle, when the machine moves forwardly and which permits a backward rotation of the carrying wheels independently of the shaft or axle. The hubs of the wheels are provided at their inner ends with cylindrical extensions 17 to receive the clutches, and the latter have tapering recesses 18 receiving short rollers 19, and forming angularly disposed faces to cause the rollers to engage the cylindrical extensions of the hubs of the wheels, when the latter rotate forwardly.

The main frame is provided at the front of the gear case with an integral forwardly extending arm or bar 20, provided at its front end with a substantially inverted U-shaped yoke 21 to which the inner shoe 22 of the cutting apparatus is pivotally connected. The yoke is connected with the sleeve by a brace or coupling bar 23, arranged at an angle to the bar or arm 20 and provided at its front end with a forked portion 24, having an integral inverted U-shaped attaching plate 25, which is bolted, or otherwise secured to the yoke at the inner side thereof. The rear end of the coupling bar or brace 23 is secured by a bolt, or other suitable fastening device, and the ear or lug 26, formed integral with the sleeve, is arranged at an angle to the same. The lug or ear 26 is located at a point between the center of the axle and the wheel 15, and the coupling bar or brace forms a rigid connection.

The inner shoe, to which the inner end of the finger bar 27 is secured, is provided with a pair of lugs or ears 28 and 29, which extend between the legs of the yoke 21, and the said shoe is also provided at its rear end with a lug or ear 30, which is arranged at the rear face of the rear leg of the yoke. The front lug or ear 28 is provided with a forwardly projecting pivot 31, which operates in a substantially vertical slot 32 of the front leg of the yoke. The rear leg of the yoke is provided with a slot or opening 33 in which is arranged a block 34, having an opening for a pivot 35, and the latter is mounted in registering perforations of the ears or lugs 29 and 30. The pivots 31 and 35 permit the cutting apparatus to swing upwardly and downwardly in a direction transversely of the mower, and they also enable the inner shoe to be tilted backwardly and forwardly. The inner shoe is also provided with spaced bearings 36, located at the inner side of the yoke and receiving a crank shaft 37, having a crank bend 38, operating between the spaced bearings 36 and connected with the inner end of the cutter or sickle bar 39 by a link or short pitman 40. The link 40 is bifurcated at its outer end to receive a lug or ear 41 of the cutter or sickle bar, which is reciprocated when the crank shaft is rotated. The sickle or cutter bar may be slidably mounted on the finger bar in any preferred manner, and any desired form of cutting apparatus may be employed.

The crank shaft is provided at its rear end with a transverse pivot 42, and is connected by a knuckle joint 43 with a section or member 44. The knuckle joint 43 embodies a casing composed of two separable sections secured together by suitable fastening devices 45, which pass through registering perforations of the projecting flanges. The casing is provided at its ends with flared openings 46 and 47, arranged in planes at right angles to each other. The opening 46 receives the rear end of the crank shaft, and the casing is provided at the inner end of the opening 46 with a bearing opening 48, arranged transversely with relation to the flared opening 46 and receiving the pivot 42. The tubular member 44, which receives a telescopic member 49, is provided with a neck 50, which operates in the flared opening 47 and which is provided with a pivot 51. The pivot 51 is arranged transversely with relation to the pivot 42 and the upper opening 47, and is received in a bearing opening 52. The bar or member 40 is provided with a longitudinal opening, and the other bar or member 49, which is slidable into and out of the member 44, is connected by a knuckle joint 53 with an upper shaft 54, arranged at an inclination and journaled in suitable bearings 55 of the gear case. The knuckle joint 53 embodies a casing constructed similar to the casing of the knuckle joint 43, the bar or member 49 being provided with a pivot 55$^a$, and the shaft 54 being provided at its front end with a pivot 56, arranged at right angles to the pivot 53. The telescopic members and the knuckle joints form a flexible shafting or connection for communicating rotary movement from the shaft 54 to the crank shaft 56, and the flexible shafting or connection is adapted to accommodate itself to the adjustments of the cutting apparatus. The shaft 54 is arranged at an inclination, and the knuckle joint 53 operates in a front recess 57 in the gear case at the inner side thereof.

The upper end of the shaft 54 is provided with a beveled pinion 58, which meshes with a beveled gear 59, and the latter is keyed, or otherwise secured to a short transverse shaft 60. The short transverse shaft 60 is journaled in suitable bearings of the side plates 4 and 5, and it extends through an opening of a longitudinal wall or partition 61 of the body of the gear case. The partition or wall 61, which is formed integral with the body of the gear case, divides the same into two recesses or spaces, one of which accommodates the bevel gear wheel 59, and the other a spur pinion 62 and a spur wheel 63. The spur wheel 63, which meshes with the pinion 62, is keyed or otherwise secured to the shaft or axle 1. When the latter is carried by the wheel, rotary motion is communicated through the gearing and the flexible shafting to the crank shaft, which reciprocates the cutter or sickle bar.

The spur pinion 62 is mounted on a square portion 116 of the shaft 60, and the latter is provided with a projecting pin or key 117 for engaging recesses in the outer face of the bevel gear 59, whereby the latter is interlocked with the shaft 60. The shaft 60 is maintained normally interlocked with the gear 59 by means of a coiled spring 118, arranged on the outer ends of the shaft, which extends beyond the outer side of the gear case. The spring is interposed between a stop 119 and the gear case, the stop being preferably formed by a washer and a pin or key, as shown. The inner end of the shaft 60 is provided with a loose rounded portion 120, which extends through a perforation of an arm 121, and the latter is adapted to engage a cam flange 122, mounted on the inner plate 5 of the gear case. When the arm is engaged with the cam flange 122, the shaft 60 is moved longitudinally a sufficient distance to disengage the key or pin 17 from the bevel gear wheel 59. This throws the machine out of operation and stops the cutting mechanism. The arm 121 extends rearwardly from the shaft 60 and its rear end is bent laterally and is adapted to be readily operated by the foot of the driver.

The sleeve of the main frame is provided at opposite sides of its center with rearwardly projecting ears or studs 64, to which are pivoted depending ears or studs 65 of a plate or platform 66, having a roughened upper face to prevent the feet of the driver from slipping. A seat 67 is mounted on the plate or platform for the accommodation of the driver, the plate or platform being provided with a recessed extension 68 to which the lower end of the seat standard 69 is secured. The plate or platform is provided at one end with a longitudinal groove or recess 70, in which is secured the rear portion of a tongue 71. The grooved or recessed end portion of the plate or platform has longitudinal side flanges to fit against the side faces of the tongue, and a tool box 72 is preferably connected with the flange at the left hand side of the tongue, an oil can holder 73 being mounted in advance of the tool box.

The main frame is adapted to be tilted on the axle by means of a foot lever 74 to enable the machine to pass over a high stump, and the said foot lever, which is disposed longitudinally of the mowing machine, is located at the right hand side of the tongue. The rear end 75 of the lever 74 is pivoted to an ear or lug 76 of one of the flanges of the plate or platform 66, and the front end of the lever 74 is provided with a foot plate 77. The lever 74 is connected at an intermediate point by a link 78 with the rear portion of the gear case. When the lever 74 is depressed, the rear portion of the gear case is swung downwardly and the front portion of the main frame is swung upwardly. The front portion of the main frame is held in such elevated position by means of an upwardly extending latch 79, pivoted at its lower end to a forwardly projecting arm 80 by a pin or pivot 81, or other suitable fastening device and provided at its upper end with a head 82, extending rearwardly and arranged to engage over the foot plate of the lever 74. The arm 80 is formed integral with the right hand side or flange of the plate or platform 66, and it is provided at its front end with an upwardly projecting lug 83, forming a stop for limiting the forward swing of the latch, whereby the latch is retained in position for engaging the foot plate of the lever 74. The rearward swing of the latch 79 is limited by a suitable shoulder 84 of the arm 80.

The cutting apparatus is swung upwardly by a lifting lever 85, suitably fixed to a transverse crank shaft 86, provided at its outer end with a crank arm 87. The crank shaft is journaled in suitable bearings of toothed segments 88 and 89, and the curved arm is connected by a suitable link 90 with a lug or ear 91 of the inner shoe. When the lifting lever 85 is oscillated, the cutting apparatus will be raised or lowered according to the direction in which the lever 85 is moved. The lever 85 is secured in this adjustment by means of a spring actuated dog or detent 92, connected with a rotary lever 93 and engaging the toothed segments 88. The shaft 86 also forms a fulcrum for a tilting lever 94, provided at the bottom with a short arm 95, which is connected by a link 96 with a lug or ear 97 of the inner shoe of the cutting apparatus. The lug or ear is located in advance of the yoke, and when the tilting lever 94 is oscillated, the front end of the shoe will be raised or lowered according as the lever 94 is moved backwardly or forwardly. This adjustment sets the cutting apparatus at the proper angle and the lever 94 is secured in its adjustment by means of a spring actuated dog or detent 98, connected with a latch lever 99 and engaging the toothed segment 89.

The front side of the yoke of the main frame is provided with a forwardly projecting substantially vertical flange 100, having a plurality of perforations 101 and adjustably connected to the lower rear end of an inclined link 102, which extends upwardly and forwardly to a doubletree 103. The doubletree 103, which extends from opposite sides of the tongue, is designed to be equipped with suitable swingletrees, and it is provided at the back with an eye 104 receiving the front end of the link 102 and provided with an eccentrically arranged eye 105. The eye 105 receives a central reduced portion 106 of a roller 107 having heads at its upper and lower ends to operate in upper and lower ways 108 and 109 of a guide 110. The upper and lower heads of the roller are spaced from the whiffletree by intermediate reduced portions, located at the upper and lower edges of the eyes 105 and interposed between the saw and the heads 107. The guide, which is composed of upper and lower sections, is secured to the lower face of the tongue by front and rear bolts 111 and 112, and it is provided at its rear end with upwardly extending lugs 113, located at the side faces of the tongue and extending to the upper face thereof, whereby the guide is held against lateral movement. The guide is provided with an open rear end and it has side openings 114 through which the doubletree extends. The front end 115 of the guide is closed to form a stop for limiting the forward movement of the doubletree. By connecting the draft with the tongue, the side draft is reduced to a minimum and the strain resulting from the forward thrust of the ordinary main frame is eliminated.

The swath-board 123 is yieldably connected with the outer or divider shoe 124 by means of a spring 125, and a fastening device 126, consisting of a bolt, is provided with a nut, which engages the spring. The bolt, which is connected with the swath-board, pierces the shoe and the spring permits a limited lateral movement of the swath-board.

Having thus fully described my invention, what I claim as new and desire to secure by Letters Patent, is:—

1. In a mowing machine, the combination of a main frame provided at the front with a projecting flange or portion having a plurality of perforations located at different elevations, means for pivotally mounting the main frame a tongue, a whiffletree eccentrically pivoted to the tongue, and a central connection extending directly from the whiffletree to the projecting flange or portion of the main frame and provided with means for engaging the said perforations.

2. In a mowing machine, the combination of a main frame, means for pivotally mounting the main frame, a cutting apparatus carried by the same, a tongue, a guide secured to the tongue and provided with spaced upper and lower ways, a whiffletree extending through the space between the ways, and a roller mounted on the whiffletree and having its ends slidably engaging the upper and lower ways, said roller constituting the sole connection between the whiffletree and the ways, and a connection extending from the whiffletree to the main frame.

3. In a mowing machine, the combination of a main frame, a cutting apparatus carried by the same, a tongue, a guide mounted on the tongue and provided at opposite sides with openings and having ways arranged at the top and bottom of the said openings, a whiffletree extending through the openings of the guide, a roller mounted on the whiffletree and provided with upper and lower heads slidable in the upper and lower ways of the guides, said roller constituting the sole connection between the whiffletree and the guide and having reduced intermediate portions spacing the head of the roller from the whiffletree, and means for connecting the whiffletree with the cutting apparatus.

4. In a mowing machine, the combination of a main frame, a cutting apparatus carried by the same, a tongue, a guide secured to the lower face of the tongue and provided at opposite sides of the tongue with upwardly extending lugs, said guide being provided with side openings and having a stop at the front, a whiffletree extending through the openings of the guide and arranged to engage the stop, a pivot connected with the whiffletree and operating in the guide, and means for connecting the whiffletree with the main frame.

5. In a machine of the class described, the combination with an axle, of a main frame having a transverse sleeve to receive the axle and provided with a longitudinal gear case, a transverse plate or platform located above and hinged to the sleeve and provided with a longitudinal tongue-receiving portion extending in advance and in rear of the plate or platform and located adjacent to and spaced from the gear case, and a lever operating in the space between the gear case and the tongue-receiving portion and connected with both of the said parts.

6. In a mowing machine, the combination with an axle, of a main frame having a transverse sleeve to receive the axle and provided with a longitudinal gear case extending in advance and in rear of the axle and having a hinged top, a plate or platform hinged to the sleeve and provided with a grooved portion extending longitudinally of the machine, a tongue secured in the grooved longitudinal portion, and a lever located between the said grooved portion and the gear case and connected with both of the said parts.

7. In a mowing machine, the combination of a main frame provided at the front with a rigid yoke having front and rear slots, a cutting apparatus including a shoe provided with front, rear and intermediate lugs, the front and intermediate lugs being located between the legs of the yoke, and front and rear pivots operating in the slots of the legs of the yoke, the front pivot being mounted on the front lug and the rear pivot being supported by the intermediate and rear lugs.

8. In a mowing machine, the combination of a main frame provided at its front with a rigid yoke having front and rear slots, a cutting apparatus provided with an end shoe having front, rear and intermediate lugs, the front and intermediate lugs being located between the legs of the yoke, a pivot mounted on the front lug and operating in the front slot of the yoke, a block loosely mounted in the rear slot of the yoke, and a rear pivot extending through the block and connected with the intermediate and rear lugs.

9. In a mowing machine, the combination of a main frame provided at the front with a yoke, a cutting apparatus pivotally connected with the yoke, spaced bearings mounted on the yoke and provided with ratchet teeth, a crank shaft mounted in the bearings and connected with the cutting apparatus, a tilting lever pivotally mounted on the shaft and also connected with the cutting apparatus and provided with means for engaging the teeth of one of the bearings, and a lifting lever connected with the shaft for rotating the same to swing the cutting apparatus upwardly and downwardly, said lifting lever being provided with means for engaging the teeth of the other bearing.

10. In a mowing machine, the combination with an axle, of a main frame provided with a longitudinal gear case and having a sleeve receiving the axle, a plate pivotally connected with the sleeve and provided with a grooved portion extending longitudinally of the machine and located adjacent to and spaced from the gear case, said pivoted plate being provided at the front with an arm having an upwardly extending lug, a tongue secured in the grooved portion of the pivoted plate, a lever operating in the space between the gear case and the pivoted plate and connected with both of the said parts, and a catch mounted on the said arm and arranged to engage the lever, said catch being located in rear of the lug and having its forward movement limited by the same.

11. In a mowing machine, the combination with an axle, and carrying wheels, of a main frame pivotally mounted on the axle and provided with a gear case and having an arm extending forwardly from the gear case, a yoke rigid with and located at the front of the arm, a cutting apparatus embodying a reciprocatory cutter bar, and an inner shoe pivotally connected to the yoke, a crank shaft mounted on the inner shoe, a link connecting the crank shaft with the cutter bar and extending through the yoke, an inclined shaft mounted on the gear case, gearing located within the gear case and connecting the inclined shaft with the axle, and a flexible extensible shafting connected with the crank shaft and with the inclined shaft.

12. In a mowing machine, the combination with an axle, and carrying wheels, of a main frame pivotally mounted on the axle and provided with a gear case and having an arm extending forwardly from the gear case, a yoke rigid with and located at the front of the arm, a cutting apparatus embodying a reciprocatory cutter bar, and an inner shoe pivotally connected to the yoke, a crank shaft mounted on the inner shoe, a link connecting the crank shaft with the cutter bar and extending through the said yoke, an inclined shaft mounted on the gear case, gearing located within the gear case and connecting the inclined shaft with the axle, and a flexible extensible shafting connected with the crank shaft and with the inclined shaft.

In testimony, that I claim the foregoing as my own, I have hereto affixed my signature in the presence of two witnesses.

THOMAS E. EWER.

Witnesses:
CHARLES J. HELLER,
F. S. DUNTHER.